(12) United States Patent
Bendixen et al.

(10) Patent No.: US 10,411,571 B2
(45) Date of Patent: Sep. 10, 2019

(54) MAGNETIC COUPLING

(71) Applicant: GRUNDFOS HOLDING A/S, Bjerringbro (DK)

(72) Inventors: Flemming Buus Bendixen, Hobro (DK); Peter Kjeldsteen, Ålestrup (DK); Allan Ivo Søgaard, Hobro (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 251 days.

(21) Appl. No.: 15/321,453

(22) PCT Filed: May 27, 2015

(86) PCT No.: PCT/EP2015/061657
§ 371 (c)(1),
(2) Date: Dec. 22, 2016

(87) PCT Pub. No.: WO2015/197283
PCT Pub. Date: Dec. 30, 2015

(65) Prior Publication Data
US 2018/0212500 A1    Jul. 26, 2018

(30) Foreign Application Priority Data

Jun. 24, 2014 (EP) .................................. 14173705

(51) Int. Cl.
*H02K 1/02* (2006.01)
*H02K 7/16* (2006.01)
(Continued)

(52) U.S. Cl.
CPC ......... *H02K 16/005* (2013.01); *F04D 13/025* (2013.01); *F04D 13/027* (2013.01);
(Continued)

(58) Field of Classification Search
CPC .... H02K 49/10; H02K 49/102; H02K 49/104; H02K 1/02; H02K 7/16; H02K 15/03;
(Continued)

(56) References Cited

U.S. PATENT DOCUMENTS

| 3,678,436 A | 7/1972 | Herdrich et al. |
| 5,915,931 A | 6/1999 | Lindner et al. |

(Continued)

FOREIGN PATENT DOCUMENTS

| CN | 1217434 A | 5/1999 |
| CN | 2838137 Y | 11/2006 |

(Continued)

OTHER PUBLICATIONS

Zhu Z Q et al: "Halbach permanent magnet machines and applications: a review", IEE Proceedings: Electric Power Applications, Institution of Electrical Engineers, GB, vol. 148, No. 4, Jul. 6, 2001 (Jul. 6, 2001), pp. 299-308, XP006016918, ISSN: 1350-2352, DOI: 10.1049/IP-EPA:20010479 A the whole document.

*Primary Examiner* — Quyen P Leung
*Assistant Examiner* — Minki Chang
(74) *Attorney, Agent, or Firm* — McGlew and Tuttle, P.C.

(57) ABSTRACT

A magnetic coupling includes an inner rotor (11) and an outer rotor (9) which at least partly surrounds the inner rotor (11). These rotors (11, 9) each are formed of magnetic material (18) and are coupled to one another by way of magnetic forces. The inner rotor (11) and/or the outer rotor (9) contain powdery, magnetizable material (18). The powdery, magnetizable material (18) is magnetized at a side lying opposite the other rotor at several locations distributed over the periphery.

15 Claims, 7 Drawing Sheets

(51) Int. Cl.
  *F04D 13/02* (2006.01)
  *H01F 13/00* (2006.01)
  *H02K 15/03* (2006.01)
  *H02K 16/00* (2006.01)
  *H02K 49/10* (2006.01)
  *H01F 41/02* (2006.01)

(52) U.S. Cl.
  CPC .............. *H01F 13/003* (2013.01); *H02K 1/02* (2013.01); *H02K 7/16* (2013.01); *H02K 15/03* (2013.01); *H02K 49/106* (2013.01); *H01F 41/028* (2013.01)

(58) Field of Classification Search
  CPC ................ H02K 16/005; F16D 27/004; F16D 2027/008; F04D 13/027; H01F 13/003; H01F 41/028
  USPC ............................ 310/92, 103, 102 R, 102 A
  See application file for complete search history.

(56) References Cited

U.S. PATENT DOCUMENTS

| | | | |
|---|---|---|---|
| 6,607,370 B2 * | 8/2003 | Fukamachi | F04D 13/027 417/420 |
| 6,841,910 B2 | 1/2005 | Gery | |
| 7,057,320 B2 * | 6/2006 | Abordi | H02K 1/278 310/103 |
| 2002/0180425 A1 | 12/2002 | Morimura | |
| 2004/0066107 A1 * | 4/2004 | Gery | H02K 49/106 310/103 |
| 2011/0241469 A1 | 10/2011 | Kjeldsteen et al. | |

FOREIGN PATENT DOCUMENTS

| | | |
|---|---|---|
| CN | 102204064 A | 9/2011 |
| CN | 202679218 U | 1/2013 |
| EP | 2 056 432 A1 | 5/2009 |

* cited by examiner

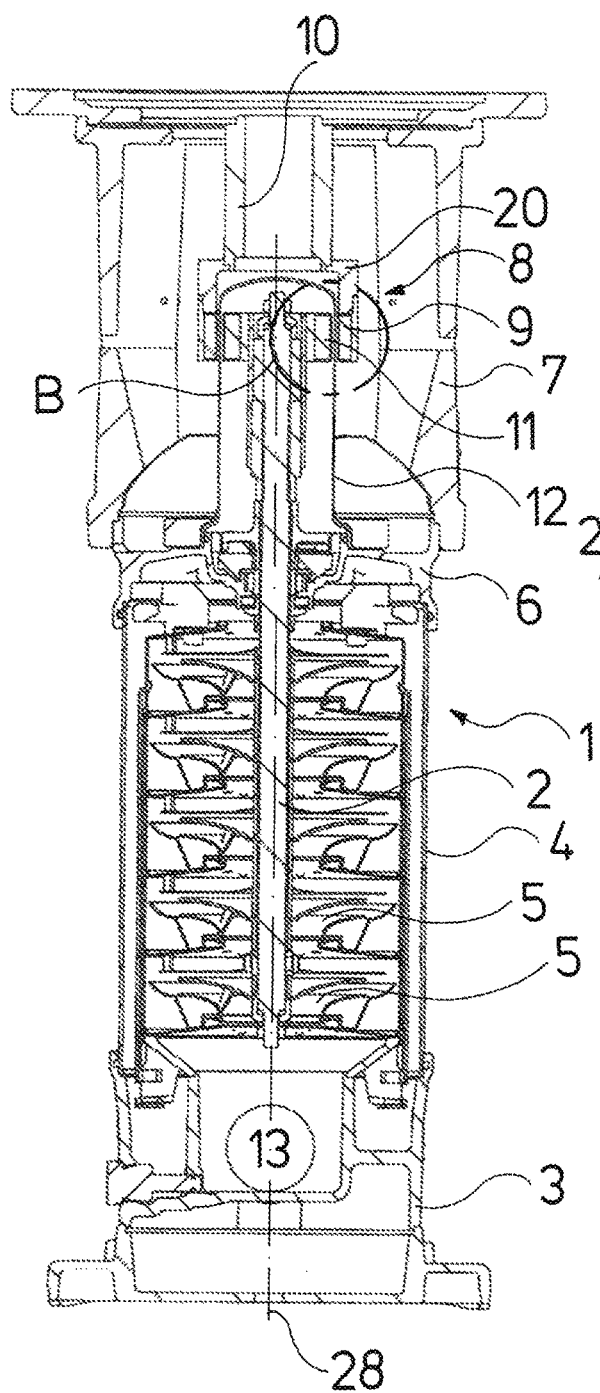
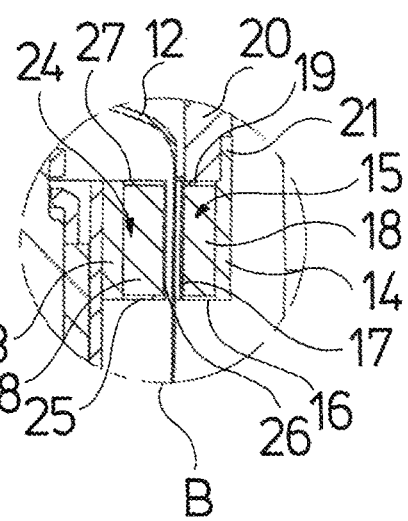
Fig.1
Fig.2

MAGNETIC COUPLING

CROSS REFERENCE TO RELATED APPLICATIONS

This application is a U.S. National Phase Application of International Application PCT/EP2015/061657 filed May 27, 2015, and claims the benefit of priority under 35 U.S.C. § 119 of European Application 14173705.6 filed Jun. 24, 2014, the entire contents of which are incorporated herein by reference.

FIELD OF THE INVENTION

The invention relates to a magnetic coupling with an inner rotor and with an outer rotor which at least partly surrounds this, the rotors each comprising magnetic material and being coupled to one another by way of magnetic forces, as well as to a method for manufacturing a rotor for such a magnetic coupling.

BACKGROUND OF THE INVENTION

Magnetic couplings of the type being discussed here are counted as belonging to the state of the art and are applied for example with centrifugal pumps, in order to drive-connect the motor shaft to the pump shaft, but also however to mechanically separate these from one another. It is particularly with pumps which are provided for delivering aggressive media that such a magnetic coupling is provided, wherein a can is arranged in the gap between the inner and the outer rotor, and this can forms part of a can pot which hermetically seals the pump to the outside and thus in particular also to the motor.

A magnetic coupling according to the state of the art and in which parallelepiped permanent magnets are located, and are arranged on the one hand in an inner rotor and on the other hand in an outer rotor, is known from EP 2 056 432 A1. The manufacture of such rotors is comparatively cumbersome, since the permanent magnets are to be reliably fixed in the respective rotors. Moreover, the known magnetic coupling has a radial construction height which is caused by the permanent magnets on the one hand, the mechanical construction on the other hand, but also by the necessary soft-magnetic backing serving as a yoke and being necessary, in order to close the magnetic circuits.

The magnetic coupling known from U.S. Pat. No. 6,841,910 B2 and with which the magnets are arranged as a Halbach array, thus have a configuration which renders such a backing superfluous and is magnetically highly effective, is much more favorable inasmuch as this is concerned. The coupling described there however is extremely cumbersome with regard to the construction, since the permanent magnets have a special shape adapted to the respective diameter of the rotors and on the one hand are complex with regard to manufacture and on the other hand are even more complex with regard to assembly.

Moreover, there is also a problem with recycling with the permanent magnets of the couplings of the previously mentioned type. These permanent magnets must be carefully separated from the carrier bodies and only then can be elaborately recycled.

SUMMARY OF THE INVENTION

Against this background, it is an object of the present invention, to provide a magnetic coupling of the initially mentioned type, which on the one hand is inexpensively manufacturable and on the other hand with a comparatively small constructional size can transmit high moments, and with which the magnetic material can be easily recycled as the case maybe.

Moreover, a method for the manufacture of the rotors of such a coupling is to be provided.

The magnetic coupling according to the invention comprises an inner rotor and an outer rotor which at least partly surrounds this, and these in each case contain magnetic material and are coupled to one another by way of magnetic forces. According to the invention, the inner rotor or the outer rotor or both rotors contain a powder-like (powdery), magnetizable material which from the side lying opposite the other rotor is magnetized in several locations distributed over the periphery.

The basic concept of the invention, is not to construct a rotor of the coupling from permanent magnets as is known from the state of the art, but to provide it with powder-like magnetizable material which then after installation into the rotor, is magnetized from the side, opposite to which the other rotor magnetically coupled thereto lies, and specifically at several locations distributed over the periphery, depending on the number of magnet poles. According to the invention, it is possible to produce complex magnetization patterns in the magnetizable material, specifically patterns which are difficult to achieve with pre-manufactured magnets.

Basically, the powder-like, magnetizable material which is applied for the construction of the at least one rotor can be treated by way of auxiliary substances, in the case that these encourage the retention, increase the corrosion resistance or improve another characteristics. However, it is particularly advantageous if the powder-like, magnetizable material is applied as such, thus without additional substances which is to say additives, since then a maximal density of magnetizable material which produces comparatively large magnetic forces after the magnetization, can be applied with respect to the available volume. A particular advantage of such a pure, powder-like, magnetizable material which is not mixed with additives is the fact that it can be recycled later in a simple form, by way of it being heated to a temperature, at which the magnetization is lost, whereupon it can then be used again without further processing.

With regard to the magnetic coupling according to the invention, it is preferably the case of a radial coupling. An isotropic as well as anisotropic material can be applied as a magnetizable material.

The magnetization is particularly advantageously of a type such that a wavy-line-like (wavy-line distribution), preferably sinusoidal distribution of the magnetic flux density sets in between the rotors in planes transverse to the longitudinal middle axis and rotation axis of the coupling, in the coupled condition. A sinusoidal distribution of the magnetic flux density between the rotor is optimal, but deviations can be tolerated within limits, so that a wavy-line-like distribution fashioned in any manner can be sufficient, in order to transmit the required moment. A reduced distortion of the sine-shape can be achieved with the invention. Thus the THD (total harmonic distortion) lies in the region of 3.5%.

Advantageously, the magnetization is effected over the periphery of the rotor at the same angular distance with respect to the common longitudinal middle axis and rotation axis of the coupling. Thereby, the two rotors always have the same pole number, for example eight or twelve magnetic poles uniformly distributed over the periphery.

With the application of the magnetic coupling in a pump, but also with other applications, it is advantageous to arrange the magnetic material in a hermetically closed receptacle since this material is often prone to corrosion. Advantageously, the rotor therefore comprises such a receptacle, in which material which is magnetizable and which is magnetic after the magnetization is arranged. Thereby, the material is advantageously arranged in a compacted form, in order on the one hand to increase the material density and thus also the magnetic forces, and on the other hand so that this is positionally stable in the rotor, i.e. is not moved between the rotors due to a moment loading. For this, supporting measures with the material itself or also however on the part of the rotor, for example projections, catches, spokes or likewise, which engage into the magnetic material and produce a certain positive fit, can also be envisaged as the case maybe.

Such a receptacle within a rotor can however also be formed by an annular space which is open at least at one side and into which the magnetizable material is filled in compacted form, in order then to be subsequently magnetized. Thereby, the powder-like, magnetic material in an open space is advantageously provided with a protective coating as well as an adhesive.

The adhesive ensures that the powder-like, magnetizable material remains in its position in the space, even if the annular space is designed in an open manner at least at one side. The protective coating ensures that the magnetic material does not corrode, i.e. it is thus protected from external influences.

It is particularly advantageous if at least the receptacle or the annular space of the outer rotor has a hollow-cylindrical shape, and the ratio of the distance $X_a$ of adjacent magnetic poles on the inner diameter of the outer rotor to the thickness $T_a$ of the magnetic material in the outer rotor is between 2 and 3. The ratio has been found to be particularly favorable and represents an optimum between the material expense and the efficiency, and moreover ensures that the magnetic flux remains essentially within the annular space which is to say flows to the magnetically actively connected rotor, with the magnetization which has been initially described. The above-mention size ratio is also advantageous for the inner rotor if specifically a hollow-cylindrical receptacle or a corresponding annular space is provided there, wherein the distance $X_i$ of adjacent magnetic poles on the outer diameter of the inner rotor to the thickness $T_i$ of the magnetic material in the inner rotor is between 2 and 3. The inner rotor does not necessarily need to be designed as an annular body, but can also be formed cylindrically or with a core of solid material. However, it is sufficient to arrange magnetic material there in the previously specified magnitude ratio.

The ratio of the distance $X_a$ and $X_i$ respectively to the thickness $T_a$ and $T_i$ respectively advantageously is of a magnitude between 2.2 to 2.8, preferably about 2.5, irrespective of whether it is the case of the inner or outer rotor.

If, as is useful, the material which is magnetizable and is magnetic after the magnetization is hermetically closed in the annular space of the rotor, and the outer wall of the rotor is designed such that the permeability of the wall surrounding the magnetic material is between 1 and 2, then the magnetic flux is held essentially within the rotor, and a backing or a yoke for the magnetic return flow is not necessary, which is advantageous with regard to manufacturing technology and with regard to the construction size.

According to an advantageous further development of the invention, it is useful to set the magnetic poles in the inner and in the outer rotor obliquely seen in the longitudinal direction, and specifically at an angle between 10° and 60°, preferably 15° with respect to a parallel to the longitudinal middle axis and rotation axis, wherein the oblique setting can be effected amid a direction change, or also along a curve, wherein the purpose and reason of the design (oblique setting or curve course) is to increase the length of the pole with respect to the geometric height of the rotor. The can losses can be minimized by way of this. In particular, a V-shaped course of the poles is preferred, i.e. a zigzag pattern over the height of the respective rotor results.

Advantageously, the powder-like magnetizable material which is applied for the inner and/or outer rotor consists of 0% to 50% of soft-magnetic materials and of 50% to 100% of hard-magnetic materials. The choice of the composition is made according to economic and technical aspects, i.e. one applies as much as possible of the less expensive material, whereas with regard to the more expensive material, one applies just as much, as is necessary for the technical function, i.e. the transmission of the torque.

According to an advantageous design of the invention, one of the rotors can be provided with permanent magnets, as is counted as belonging to the state of the art, wherein these then however are particularly advantageously arranged in a Halbach-array configuration, in order to ensure a high magnetic efficiency.

It is particularly advantageous with regard to manufacturing technology, if the material in the rotor and which is magnetizable which is to say later is magnetic, is formed by one or more shaped bodies which are preferably annular and are pre-shaped from powder-like material. These shaped bodies are advantageously formed without adhesive only by way of pressing the powder and have a certain internal retention, which at least is sufficient to handle these by machine and to arrange them in the rotor or in the receptacle of the rotor. These shaped bodies, as the case may be, can comprise positive-fit means which on the rotor side cooperate with correspondingly designed positive-fit means, in order thus to ensure that a rotational lock of the respective shaped body within the rotor is present. The preshaping is advantageously effected by way of pressing, which moreover has the advantage that the material density is increased, by which means the later magnetic characteristics are also improved. As the case maybe, the powder-like material by way of a suitable adhesive can be formed into a stable shaped body which can be handled.

The method according to the invention, for manufacturing a rotor for a magnetic coupling according to the invention, is characterized in that the powder-like, magnetizable material is firstly arranged in or on the rotor, whereupon a magnetization is effected from the coupling-active side of the rotor, and specifically according to the desired pole number, in a manner distributed over the periphery of the side at the same distance.

Such a method can be effected in an automated manner. The magnetizable material is simple to handle, since it is not yet magnetic and thus can be conveyed as a bulk product. Blanks which can be mechanically handled can be formed by way of pressing as the case may be. Thereby, according to a further development of the invention, one envisages the magnetizable material being brought into the rotor, i.e. into a space in the rotor which is specially envisaged for this, for example into an annular space, and being compacted there, whereupon the rotor space is closed by way of welding and/or forming (shaping) a rotor wall. Thereby, the magnetizable material can either be introduced in a powder-like manner or already in a pre-shaped manner. In the latter case, it is also advantageous to let a further compacting within the rotor to take place. Thereby, the rotor space is either hermetically closed by way of welding or closed by way of forming, thus by way of folding the edge inwards, as the case may be with a subsequent welding. The pre-shaped magnetizable material can extend as a ring over 360° in an interrupted manner or be designed as part-rings with an extension e.g. of 180°.

The hermetic closure can also be created by way of bonding or by way of the provision of suitable sealing means between the joint elements, instead of welding.

It is particularly advantageous if the magnetizable material for a rotor is brought into two or more annular shaped bodies, preferably by way of pressing, which are subsequently arranged in an annular space of the rotor in a manner lying over one another and filling this space, and advantageously compacted once again, whereupon the space is hermetically closed.

Basically, the magnetization of the inner rotor is effected from the outer periphery and that of the outer motor from this inner periphery. This can be effected in a stepwise manner, by way of a pole being produced by way of applying an electromagnet, whereupon the respective rotor is rotated further by a predefined angle, and this being effected until all poles are created in a manner uniformly distributed about the longitudinal middle axis. Surprisingly however, it has been found that it is particularly advantageous if all poles are created simultaneously. This has the advantage that the distortion of the sinusoidal distribution of the magnetic flux density can be kept low.

The invention is hereinafter explained in more detail by way of one embodiment example represented in the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 1 is a greatly simplified longitudinal section representation showing a multi-stage centrifugal pump with a motor stool and a magnetic coupling located therein;

FIG. 2 is an enlarged representation showing the detail B from FIG. 1;

DESCRIPTION OF THE PREFERRED EMBODIMENTS

Figure 3:
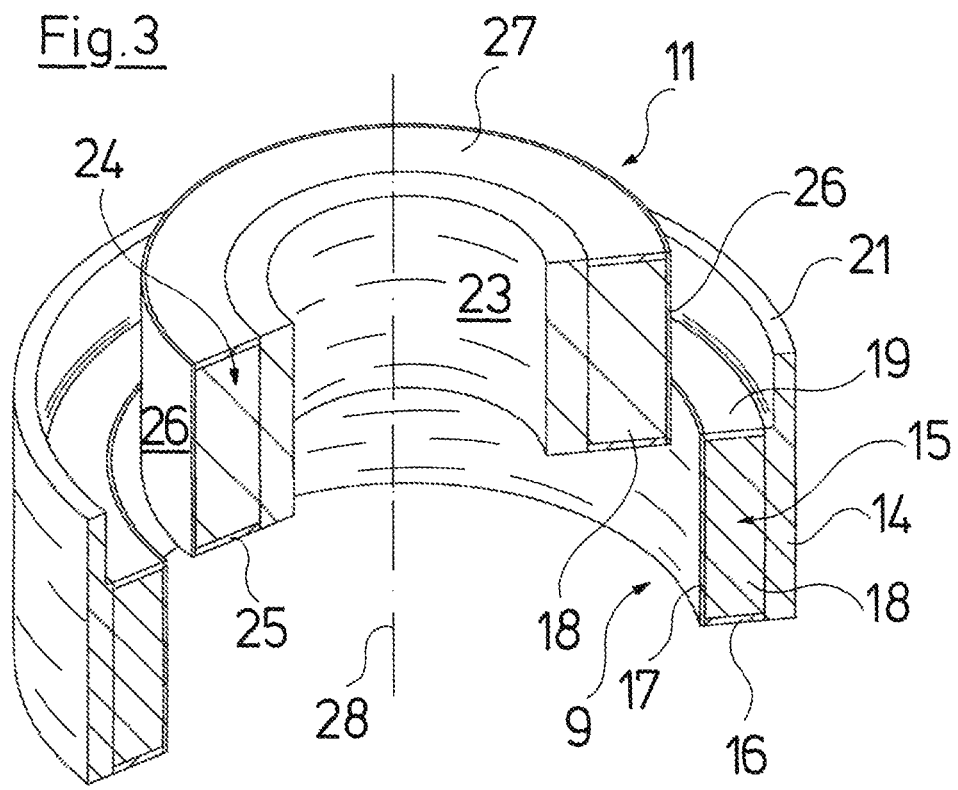
FIG. 3 is a greatly simplified enlarged and perspective longitudinal sectional representation showing an inner and an outer rotor.

Referring to the drawings, the centrifugal pump represented in FIG. 1 is a multistage centrifugal pump 1 which in some features of the construction corresponds to known centrifugal pumps of the type Grundfos CR. Hereby, it is the case of a pump which is operated with a vertical shaft 2, and is with a foot 3 which stands on the floor and onto which a middle section closed off to the outside by a jacket 4 connects, in which section impellers 5 are seated on the shaft 2. The jacket 4 which on the one hand is received in the foot 3, on the other hand is received in a head part 6, from which the upper end of the shaft 2 is led out. A so-called motor stool 7 is arranged above the head part 6 and is provided for receiving an electric motor for the drive of the pump 1, wherein this electric motor is not represented in FIG. 1.

A magnetic coupling 8 which comprises an outer rotor 9 which is connected to the motor shaft via a receiver 10, as well as an inner rotor 11 which is connected to the upper end of the shaft 2 in a rotational fixed manner, is provided in the region of the motor stool 7. A can pot 12 which hermetically closes the pump 1 in the region of the head part 6 is arranged between the outer rotor 9 and the inner rotor 11.

With regard to the represented centrifugal pump 1, it is the case of an inline pump. The fluid which reaches into a suction chamber 13 in the foot 3 via a suction connection is delivered via the pump stages lying over one another, from the impeller to the diffuser and from there to the next stage, and via an annular channel formed within the jacket 4 is led back into the foot 3 and there is led to a pressure connection, as is counted as belonging to the state of the art, to which one refers inasmuch as this is concerned. The drive connection to the motor is effected via the magnetic coupling 8, wherein the outer rotor 9 is connected in a rotationally fixed manner to the motor shaft, and the inner rotor 11 in a rotationally fixed manner to the shaft 2 of the centrifugal pump 1. The moment transmission is effected exclusively magnetically through the can pot 12.

The outer rotor 9 has an essentially hollow-cylindrical annular shape with a reinforced, supporting outer wall 14 which radially outwardly delimits an annular space 15 open to the top. To the bottom, this annular space 15 is delimited by a wall 16 which forms the base of the annular space 15 and which connects to the outer wall 14 in an aligned or flush manner. An inner wall 17 on the inner side of the wall 16 extends parallel to the outer wall 14 upwards as far as the reinforced part of the outer wall 14 which is clearly visible in FIGS. 2 and 3 reaches. This annular space 15 which is open to the top is filled with magnetizable, powder-like (powdery) material 18 which is filled into the annular space 15 and is compacted from above by way of a pressing tool. Thereby, the powdery material 18 can either be filled into the annular space 15 in a powdered manner and compacted in layers, or consist of shaped bodies of powdery material (not shown) which are formed previously by way of pressing and which are applied into the annular space 15 in a manner lying over one another, and subsequently pressed once again.

This annular space 15, after the filling and the compacting with powdery, magnetizable material 18 is closed by an annular cover or lid 19 which closes the annular space 15 to the top and is peripherally welded to the inner wall 17 and the outer wall 14, so that the material is hermetically closed by the surrounding material, which here is stainless steel. The outer wall 14 comprises an upwardly projecting collar-like (collar) section 21 which is provided for receiving a rotation part 20 designed in a corresponding step-like (step) manner and forming part of the receiver 10 for the motor shaft. The rotation part 20 at both sides is peripherally connected to the outer rotor 9 by way of welding.

Figure 4:
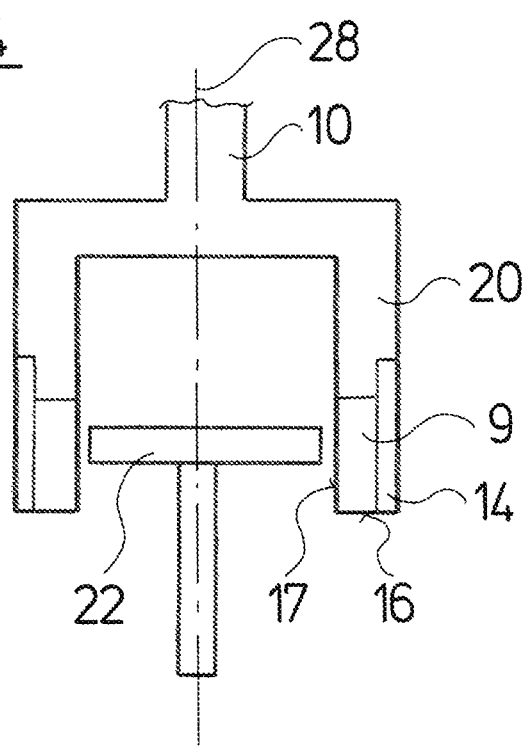
FIG. 4 is a schematic representation of the outer rotor on magnetization.

The thus formed rotor component which is schematically represented in FIG. 4 is then magnetized from the inner side, thus on the inner wall 17, by way of the insertion of a head 22 of a magnetizing device, and specifically in a manner such that the desired number of poles, here for example eight poles, are produced at the same angular distance in a manner distributed over the periphery. The head 22 for this comprises eight (not shown) magnetizing probes which are magnetically activated via one or more electromagnets and carry out the desired magnetization of the material 18 in a manner such that in combination with the likewise eight-poled inner rotor 11 which is yet described further below in detail, a sinusoidal distribution of the magnetic flux density arises in the gap between the rotors 9 and 11, thus in the region of the can pot 12, in the coupled condition as is schematically represented by way of FIG. 5.

The inner rotor 11 in the represented embodiment is constructed similarly to the outer rotor 9. It comprises a reinforced inner wall 23 which is designed in a hollow-cylindrical manner and onto which an annular space 24 connects to the outside, said annular space being delimited on its lower side by a base 25 and on its outer side by a peripheral outer wall 26. This annular space 24 is likewise filled with powdery, magnetizable material 18 which is compacted there. Here, in an analogous manner to the outer rotor 9, either the material 18 is filled in a layered manner and compacted, or preferably is applied in pre-pressed shaped parts in the form of rings which as the case may be are yet one again pressed in their entirety within the annular space 24, whereupon these are closed to the top by an annular cover lid 27 which at its outer side is peripherally welded to the outer wall 26, and at the inner periphery is peripherally welded to the inner wall 23, so that the annular space 24 with the material 18 located therein is hermetically closed. The inner wall 23 is connected to the shaft 2 of the centrifugal pump 1 in a rotationally fixed manner. The magnetizable material 18 within the annular space 24 is magnetized on the outer side, thus from the outer wall 26, and specifically likewise in eight poles, which are preferably simultaneously magnetized and have an equal angular distance about the longitudinal middle axis 28 which is 45.

Figure 6:
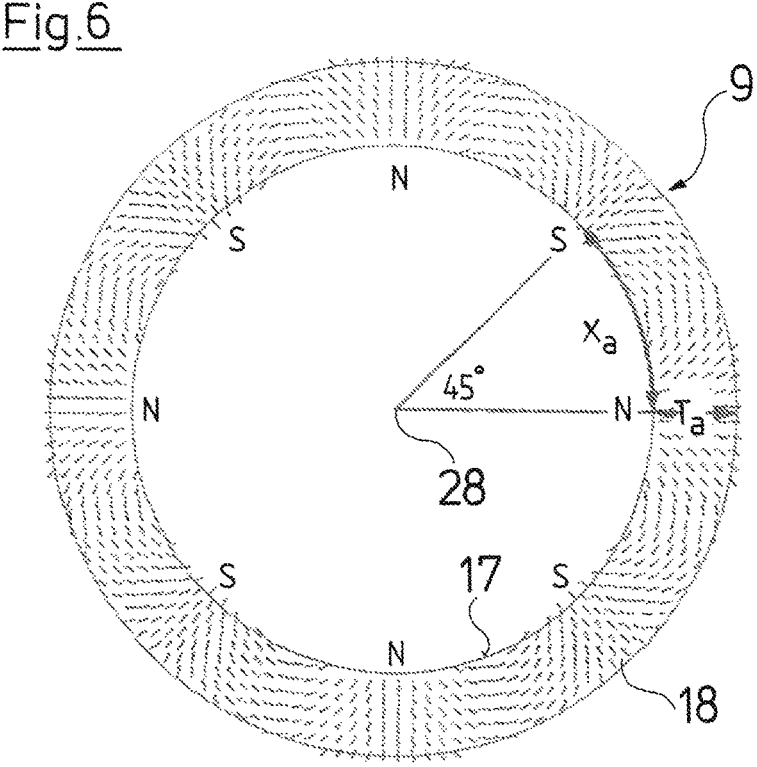
FIG. 6 is a diagram showing the magnetic alignment in the outer rotor in a plane transverse to the longitudinal axis.
Figure 7:
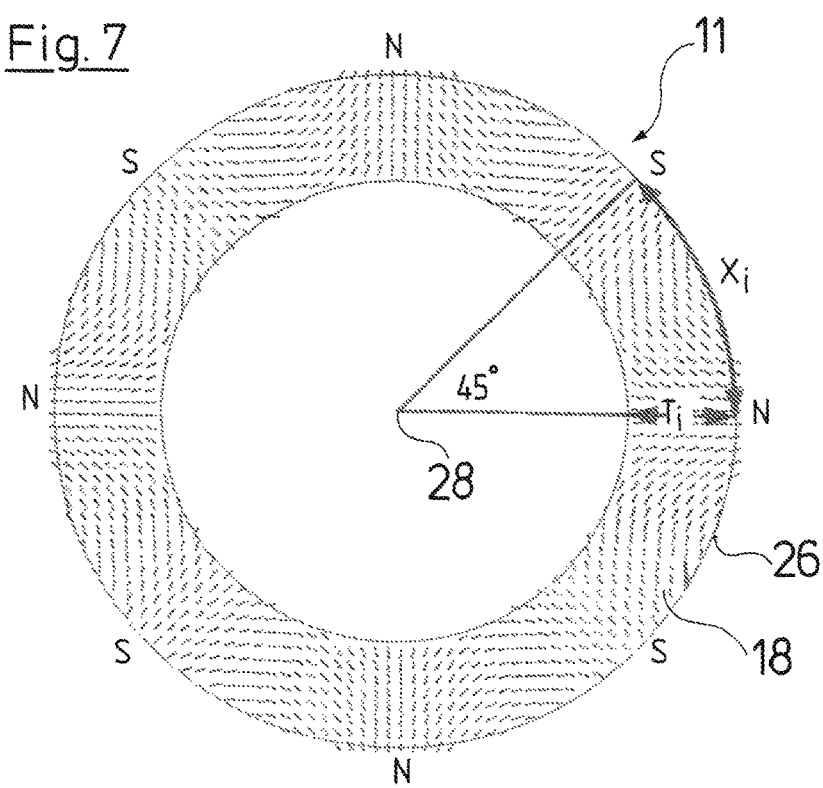
FIG. 7 is a diagram showing the magnetic alignment in the inner rotor in a plane transverse to the longitudinal axis.

The magnetization of the material 18 within the annular space 15 or the annular space 24 can be clearly recognized by way of FIGS. 6 and 7. It is also shown in FIGS. 6 and 7 as to which size relationships are to be preferred. FIG. 6, which represents a section through the outer rotor 9 transverse to the longitudinal axis 28, illustrates how the magnetic alignments of the here exemplarily represented eight poles are directed within the magnetic material 18. The inner rotor and the outer rotor have the same pole number.

The arrangement is particularly effective when the distance $X_a$, thus the distance of adjacent magnetic poles on the inner diameter, i.e. on the inner wall (inner peripheral surface) 17 of the outer rotor 9 to the thickness $T_a$ of the magnetic material 18 in the outer rotor 9 is between 2 and 3, preferably 2.5. Accordingly, it is the case that the dimensioning of the inner rotor 11 is selected such that the ratio of the distance $X_i$ of adjacent magnetic poles on the outer diameter (outer peripheral surface) of the outer wall 26 of the inner rotor 11 to the thickness $T_i$ of the magnetic material in the inner rotor 11 is between 2 and 3, preferably between 2.2 and 2.8, ideally 2.5. Thus, the magnet has an unfavorable operating point in the case that the ratio is smaller than 2, since the magnet material is poorly utilized. The magnetization is made significantly more difficult if T is too large. The least magnet powder is consumed and the greatest magnetic flux density is achieved in the ideal case between 2 and 3.

Figure 5:
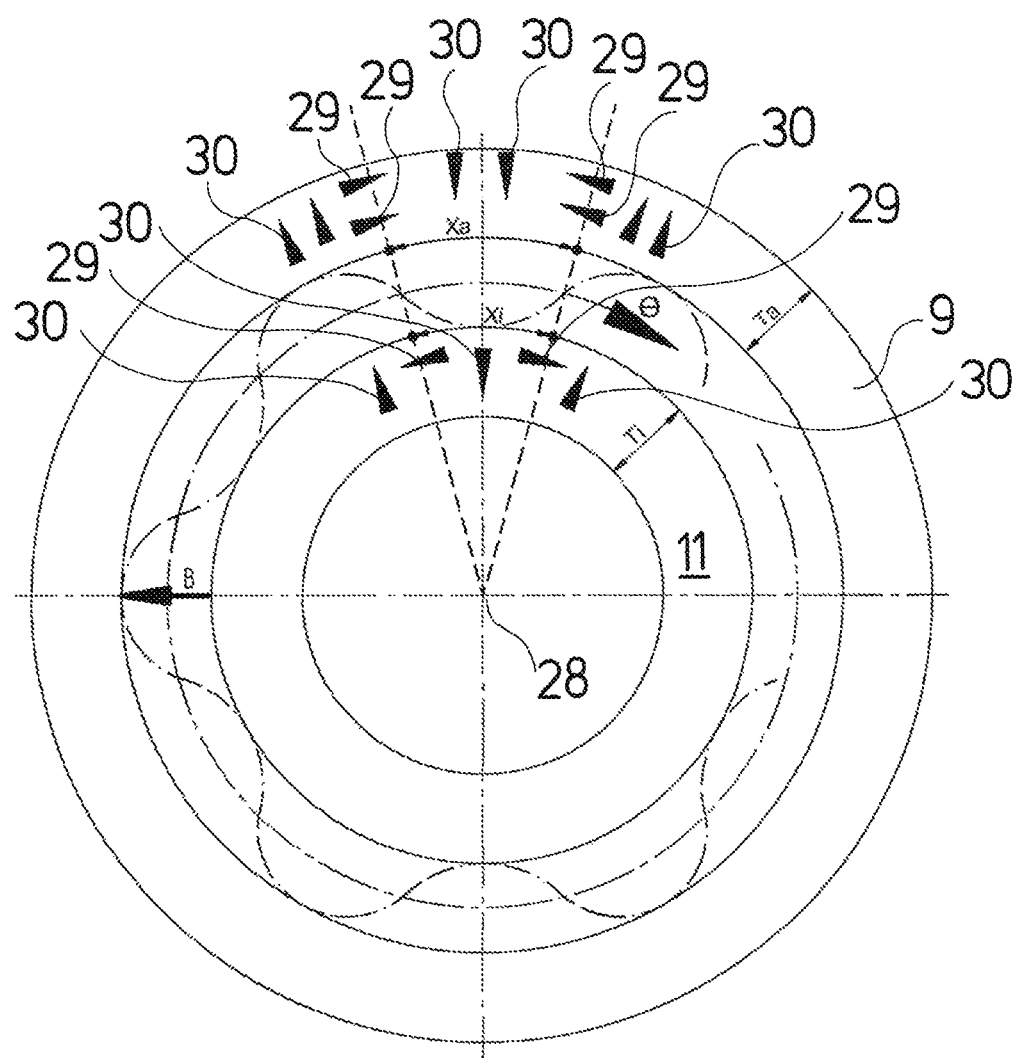
FIG. 5 is a diagram showing the magnetization in the inner and the outer rotor as well as the flux density distribution in the gap between the rotors, in a plane transverse to the longitudinal axis.

As FIG. 5 particularly illustrates, the tangential magnetic flux 29 runs within the annular spaces 15 and 24, whereas the radial magnetic flux 30 enters through the annular gap and the can pot 12 and there, according to the pole arrangement, produces a sinusoidal distribution of the flux density B, which is particularly favorable for the torque transmission.

Figure 9:
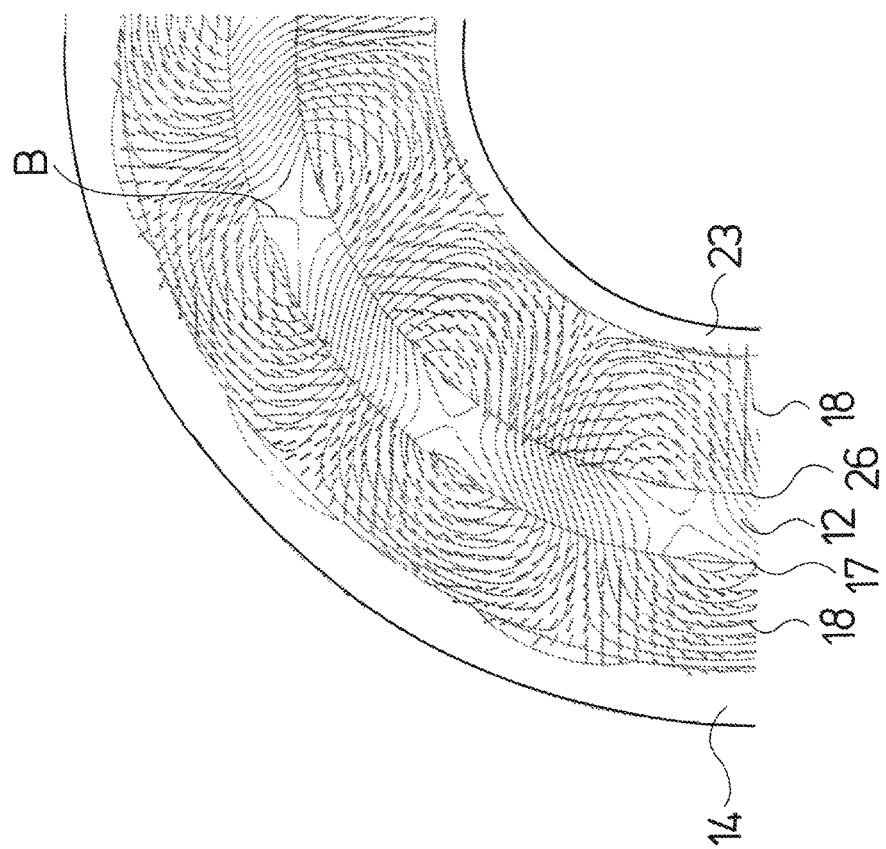
FIG. 9 is a diagram showing the magnetic alignment and the magnetic flux in a coupling according to the invention, in a plane transverse to the longitudinal axis.
Figure 8:
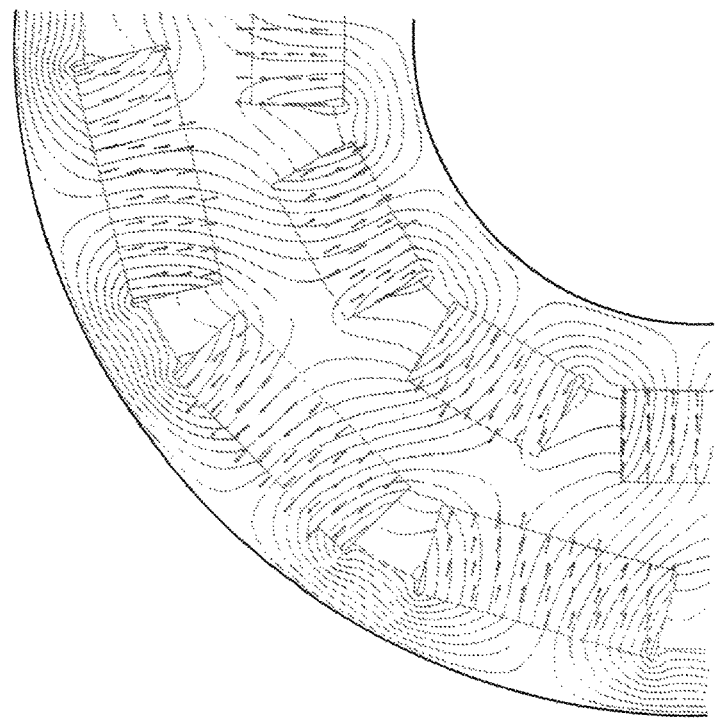
FIG. 8 is a diagram showing the magnetic alignment and the magnetic flux in a magnetic coupling with parallelepiped permanent magnets according to the state of the art.

As is represented by way of FIGS. 8 and 9, in which the magnetic alignment as well as the course of the flux lines with the magnet coupling according to the invention (FIG. 9) and with the state of the art according to EP 2 054 432 A1 (FIG. 8) are represented, it is evident that the magnetic flux is effected almost exclusively within the magnetic material 18, i.e. within the annular spaces 15 and 24, so that one can make do without a backing or yoke as is applied with the state of the art, and this reduces the radial construction size.

Figure 10:
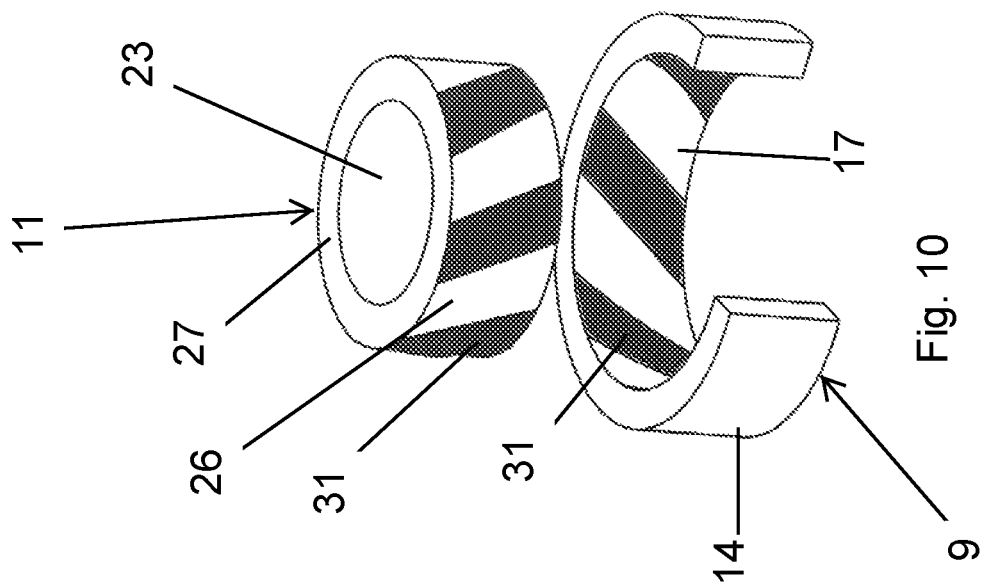
FIG. 10 is a perspective view of the inner rotor and the outer rotor.
Figure 11:
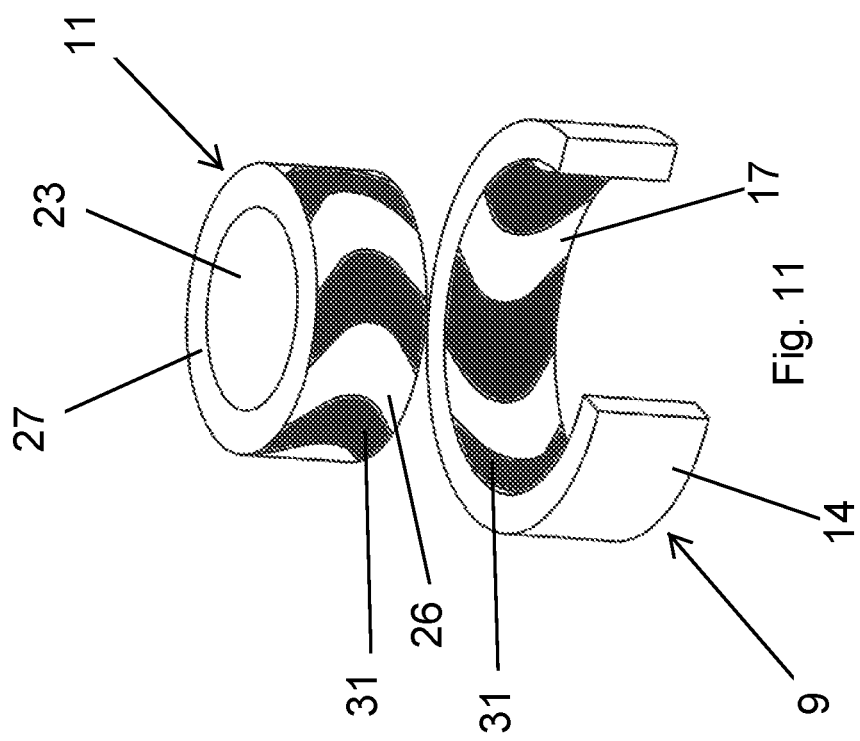
FIG. 11 is another perspective view of the inner rotor and the outer rotor.

FIG. 10 shows magnetic poles 31 in the inner and in the outer rotor run obliquely seen in a longitudinal direction. FIG. 11 shows the magnetic poles 31 in the inner and in the outer run in a curvilinear manner seen in a longitudinal direction.

While specific embodiments of the invention have been shown and described in detail to illustrate the application of the principles of the invention, it will be understood that the invention may be embodied otherwise without departing from such principles.

The invention claimed is:

1. A magnetic coupling comprising:
  an inner rotor; and
  an outer rotor which at least partly surrounds the inner rotor, said rotors each comprising magnetic material and being coupled to one another by way of magnetic forces, wherein the inner rotor or the outer rotor or both the inner rotor and the outer rotor contain powdery magnetizable material which from a side lying opposite the other rotor, is magnetized at several locations distributed over a periphery thereof, at least one of the rotors comprising a hermetically closed receptacle, in which the magnetic material is arranged in a compacted form, wherein at least the receptacle of the outer rotor has a hollow-cylindrical shape and a ratio of a distance of adjacent magnetic poles along an inner peripheral surface of the outer rotor to a thickness of the magnetic material in the outer rotor is between 2 and 3.

2. A magnetic coupling according to claim 1, wherein the magnetization at several locations is such that in the coupled condition, a wavy-line distribution of the magnetic flux density exists between the rotors in planes transverse to the longitudinal middle axis and rotation axis of the coupling.

3. A magnetic coupling according to claim 1, wherein the magnetization at several locations is distributed over the periphery of the rotor at a same angular distance with respect to a common longitudinal middle axis and rotation axis of the coupling.

4. A magnetic coupling according to claim 1, wherein at least one of the rotors comprises an annular space which is open at least at one side and in which the magnetic material is arranged, in compacted form, wherein the powdery, magnetic material comprises a protective coating and an adhesive.

5. A magnetic coupling according to claim 4, wherein:
the annular space of the inner rotor has a hollow-cylindrical shape and a ratio of the a distance of adjacent magnetic poles along an outer peripheral surface of the inner rotor to a thickness of the magnetic material in the inner rotor is between 2 and 3.

6. A magnetic coupling according to claim 1, wherein at least the receptacle of the inner rotor has a hollow-cylindrical shape and a ratio of a distance of adjacent magnetic poles along an outer peripheral surface of the inner rotor to a thickness of the magnetic material in the inner rotor is between 2 and 3.

7. A magnetic coupling according to claim 1, wherein a permeability of an outer wall of the outer rotor, which surrounds the magnetic material, is between 1 and 2.

8. A magnetic coupling according to claim 1, wherein magnetic poles in the inner and in the outer rotor run obliquely seen in a longitudinal direction at an angle of between 10° and 60°.

9. A magnetic coupling according to claim 1, wherein magnetic poles in the inner and in the outer rotor run in a curvilinear manner seen in a longitudinal direction.

10. A magnetic coupling according to claim 1, wherein the powdery, magnetizable material consists of 0 to 50% by volume of soft-magnetic materials and of 50 to 100% by volume of hard-magnetic materials.

11. A magnetic coupling according to claim 1, wherein one of the rotors comprises permanent magnets which are arranged in a Halbach-array configuration.

12. A magnetic coupling according to claim 1, wherein the magnetic material in the rotor is formed by one or more fully or partially annular shaped bodies which are pre-shaped from powdery material.

13. A magnetic coupling comprising:
an inner rotor; and
an outer rotor which at least partly surrounds the inner rotor, said rotors each comprising magnetic material and being coupled to one another by way of magnetic forces, wherein the inner rotor or the outer rotor or both the inner rotor and the outer rotor contain powdery magnetizable material which from a side lying opposite the other rotor, is magnetized at several locations distributed over a periphery thereof, at least one of the rotors comprising a hermetically closed receptacle, in which the magnetic material is arranged in a compacted form, wherein at least the receptacle of the inner rotor has a hollow-cylindrical shape and a ratio of a distance of adjacent magnetic poles along an outer peripheral surface of the inner rotor to a thickness of the magnetic material in the inner rotor is between 2 and 3.

14. A magnetic coupling comprising:
an inner rotor; and
an outer rotor which at least partly surrounds the inner rotor, said rotors each comprising magnetic material and being coupled to one another by way of magnetic forces, wherein the inner rotor or the outer rotor or both the inner rotor and the outer rotor contain powdery magnetizable material which from a side lying opposite the other rotor, is magnetized at several locations distributed over a periphery thereof, at least one of the rotors comprising an annular space which is open at least at one side and in which the magnetic material is arranged, in compacted form, wherein the powdery, magnetic material comprises a protective coating and an adhesive, at least a receptacle of the outer rotor having a hollow-cylindrical shape and a ratio of a distance of adjacent magnetic poles along an inner peripheral surface of the outer rotor to a thickness of the magnetic material in the outer rotor is between 2 and 3, wherein the annular space of the outer rotor has a hollow-cylindrical shape and a ratio of a distance of adjacent magnetic poles along an inner peripheral surface of the outer rotor to a thickness of the magnetic material in the outer rotor is between 2 and 3.

15. A magnetic coupling comprising:
an inner rotor; and
an outer rotor which at least partly surrounds the inner rotor, said rotors each comprising magnetic material and being coupled to one another by way of magnetic forces, wherein the inner rotor or the outer rotor or both the inner rotor and the outer rotor contain powdery magnetizable material which from a side lying opposite the other rotor, is magnetized at several locations distributed over a periphery thereof, wherein at least one of the rotors comprises an annular space which is open at least at one side and in which the magnetic material is arranged, in compacted form, wherein the powdery, magnetic material comprises a protective coating and an adhesive, wherein at least a receptacle of the inner rotor has a hollow-cylindrical shape and a ratio of a distance of adjacent magnetic poles along an outer peripheral surface of the inner rotor to a thickness of the magnetic material in the inner rotor is between 2 and 3, the annular space of the inner rotor having a hollow-cylindrical shape and a ratio of the distance of adjacent magnetic poles along an outer peripheral surface of the inner rotor to a thickness of the magnetic material in the inner rotor is between 2 and 3.

* * * * *